United States Patent [19]

Franke

[11] 4,246,970
[45] Jan. 27, 1981

[54] TILLER WITH AUTOMATICALLY ADJUSTED ANGLE OF ATTACK

[76] Inventor: Gordon R. Franke, Rte. 3, Kirksville, Mo. 63501

[21] Appl. No.: 956,082

[22] Filed: Oct. 30, 1978

[51] Int. Cl.² ............................................. A01B 1/06
[52] U.S. Cl. .................................. 172/372; 172/371
[58] Field of Search ............... 172/371, 372, 376, 377; 294/53.5; D8/7, 8

[56] References Cited

U.S. PATENT DOCUMENTS

| 53,332 | 3/1866 | Plumer | 172/372 |
|---|---|---|---|
| 183,930 | 10/1876 | Howard | 172/372 |
| 924,124 | 6/1909 | Worcester | 172/376 |
| 1,239,316 | 9/1917 | Svendsen | 172/376 |
| 1,279,704 | 9/1918 | Jones | 172/371 |
| 1,500,271 | 7/1924 | Rumbaugh | 172/371 |
| 1,685,399 | 9/1928 | Fanberg | 172/372 |

FOREIGN PATENT DOCUMENTS 1016474  9/1957  Fed. Rep. of Germany ........... 172/376

*Primary Examiner*—Richard T. Stouffer
*Attorney, Agent, or Firm*—Glen R. Simmons

[57] ABSTRACT

The invention relates to a hand device for tilling the earth comprising a flat blade sharpened on all edges which is mounted on a side of a resilient, preferably trapezoidal shaped, frame, with the opposite side of the frame being mounted upon an elongated handle. The tilling device includes an automatic depth control including the resilient frame.

10 Claims, 3 Drawing Figures

TILLER WITH AUTOMATICALLY ADJUSTED ANGLE OF ATTACK

BACKGROUND OF THE INVENTION AND OBJECTS

Despite the long and widespread usage of the garden tool known as the hoe, the hoe is inefficient strokewise and, of course, constantly requires an updown chopping action which is unacceptable to many gardners.

An object of the present invention is to provide a tilling tool which has a resiliently mounted cutting blade.

A further object of the present invention is to provide a hand tiller which is used by motions away and toward the user.

A further object of the invention is to provide a tillage tool on which the cutting blade is resiliently mounted and which mounting permits a variable angle of attack depending upon the resistance encountered by the cutting blade of the device.

A further object of the invention is to provide a tillage tool which employs a resiliently mounted cutting blade and which tool is employed by the use of horizontal strokes.

A further object of the invention is to provide a tillage tool which employs a resiliently mounted cutting blade but which resilient structure has a stop beyond which deformation is prevented.

A further object of the invention is to provide a tiller which has a resiliently mounted blade which automatically adjusts the blade cutting angle responsive to soil resistance encountered by the blade.

A further object of the invention is to provide a tiller which has a resiliently mounted cutting blade which automatically adjusts the blade cutting angle responsive to resistance encountered by said blade in the soil which provides for stops to limit the extent of deformation of the resilient blade mounting structure.

A further object of the present invention is to provide a hand tiller having a resiliently mounted cutting blade with stops to proclude excessive deformation of the blade mounting structure.

A further object of the invention is to provide a tillage tool which in suitably trashfree soil may be used with push or pull strokes only.

DESCRIPTION OF THE PREFERRED EMBODIMENT

Figure 1:
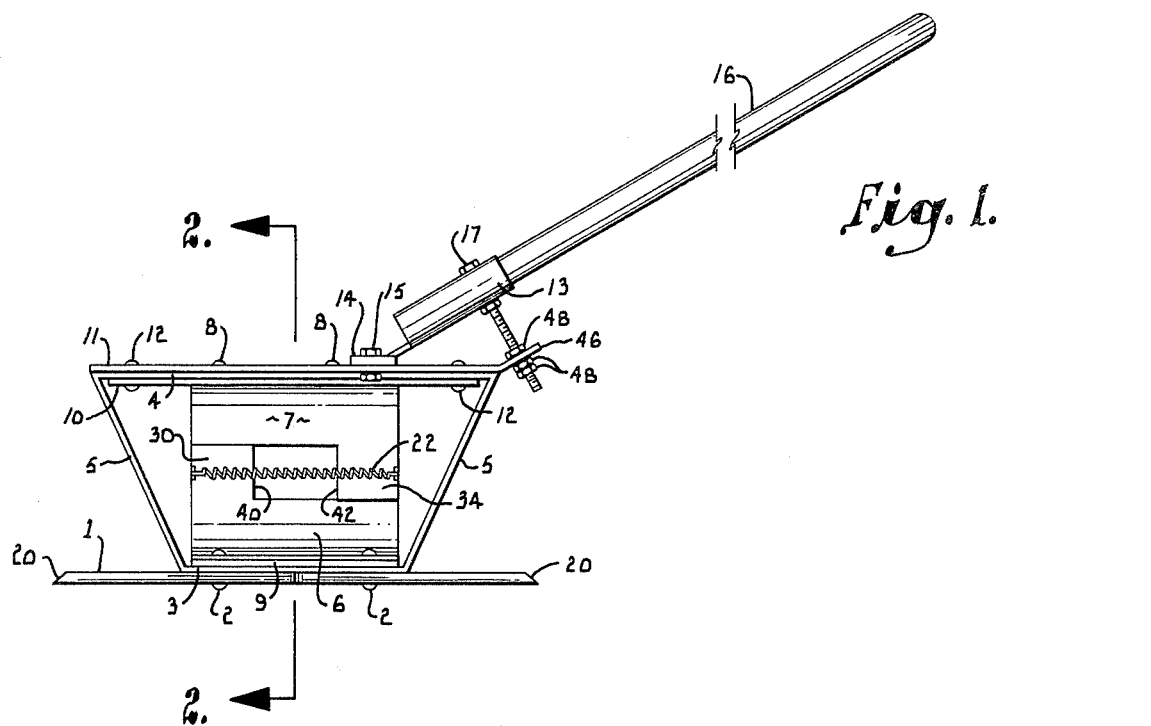
FIG. 1 is a side view of the applicant's tiller.
Figure 2:
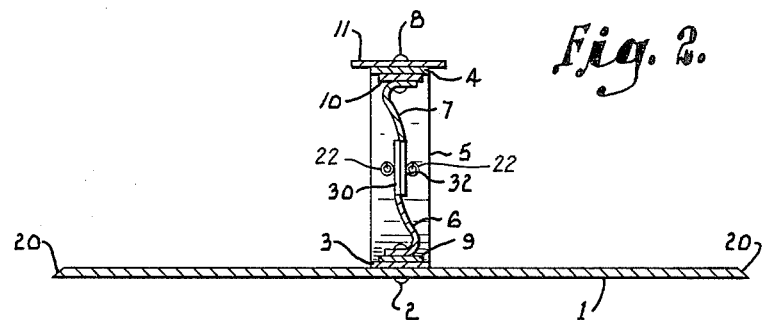
FIG. 2 is a cross-section view of the device along the lines of 2—2 in FIG. 1.
Figure 3:
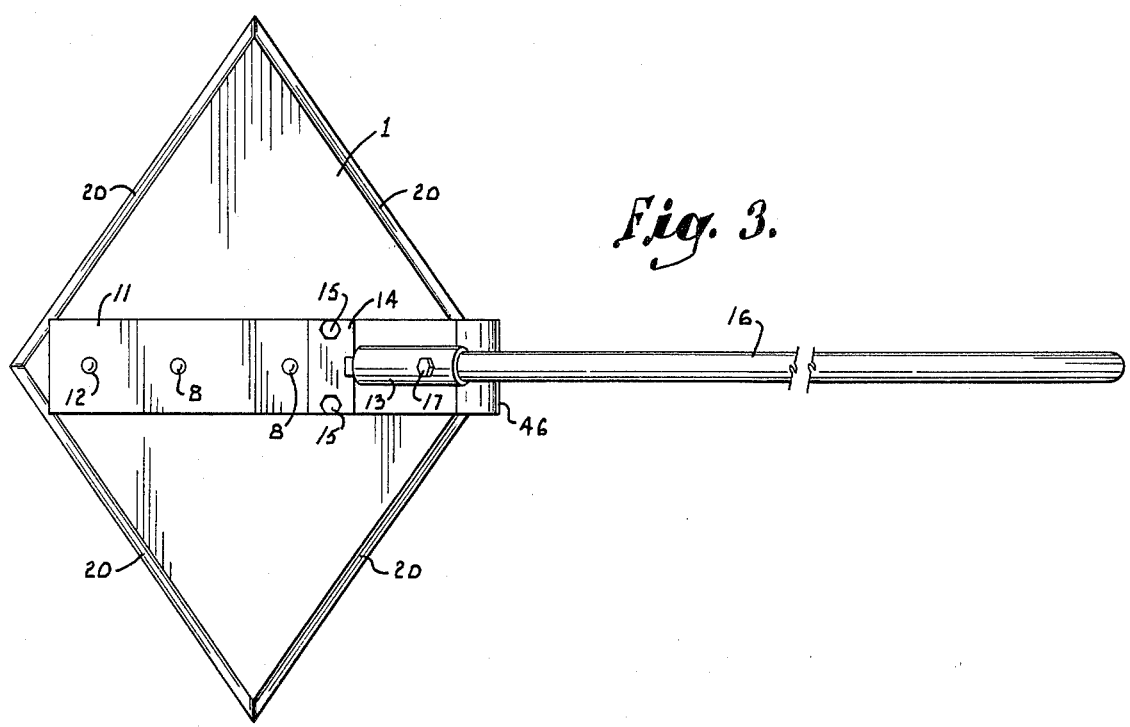
FIG. 3 is a top view of the applicant's tiller.

Referring to FIGS. 1, 2 and 3 there is seen a preferred embodiment of the device of the invention. More specifically and in connection with FIG. 1 there is seen a flat, diamond shaped tiller blade 1. To blade 1 there is, by rivets 2 or other suitable connecting means, connected a trapezoidal shaped resilient metal frame having a bottom portion 3, top portion 4 and side portions 5. Mounted within the trapezoidal shaped frame 3, 4, 5 are plate-stops 6 and 7. Plate-stop 6 is mounted by rivets 2 or other suitable means to bottom 3 of the trapezoidal shaped frame and to blade 1. Plate-stop 7 is mounted by rivets or other suitable means 8 on the top portion 4 of the trapezoidal frame. Between plate-stop 6 and frame bottom portion 3, there is located a flat piece of metal 9 securely held by rivets 2 to portion 3 and between plate-stop 7 and frame top-portion 4 is located a flat metal strip 10 held by rivets or other suitable means 8 and 12. The purpose of strips 9 and 10 is to lend maintenance-free rididity to the top and bottom portions of the trapezoidal frame, yet allowing flexure in side portions 5. Such structural arrangement mitigates the stress on top portion 4 and bottom portion 3 around the rivet holes due to flexure of the frame where blade 1 encounters resistance during usage. Mounted atop frame portion 4 is a handle base plate 11 securely held to 4 and 7 by rivets 8 and 12. A handle holder 13 is rigidly connected to a metal strap 14 which is held by bolts 15 to 11. A preferably wooden handle 16 is inserted into 13 and held there by friction and bolt 17. Bolt 17 aside from holding handle 16 in 13 also serves as a means for adjusting the angle of handle 16 relative to plate 11. This is accomplished by the fact that bolt 17 at its lower end in FIG. 1 rests in a slot (not shown) in the slightly upward turned portion 46 of 11 at the right end thereof as shown in said FIG. 1 and is held relative to 46 by nuts 48 which turn on the threaded portion of 17. Thus when it is desired to tilt the handle 16, nuts 48 are turned approximately up or down on 17 then tightened against the edges of the above noted slot in 46. Plate 11 is somewhat wider than 4 and 7, thus bolt 15 goes through 14 and 11 only.

Additionally, the slot in 46 with lock nuts on bolt 17 can be used to provide a rocking motion of the tillage head allowing it to function in the manner of a scuffle hoe type action combined with the self-adjusting angle of attack previously discussed.

A coil spring 22 may be used to aid the resiliency of spring steel side portions 5 in returning the trapezoidal frame to its quiescent position following in use deformation. Spring 22 is positioned around the plate-stops 6 and 7, as depicted in FIG. 1. Alternatively a compression spring not shown can be positioned and held by appropriate brackets between edges 42 and 40 to aid the resiliency of spring steel side portions 5.

With respect to the structural arrangement of plate-stops 6 and 7, each is a U-shaped piece with plate 7 being mounted in an upsidedown position in a manner previously described. U-shaped plate-stop 6 is mounted in an upright position. Plates 6 and 7 are positioned such that the legs of the U are interleaved i.e., as seen in FIG. 1 the left leg 30 of U-shaped piece 6 lies in front of the left leg 32 of plate 7 or as seen in FIG. 2 leg 30 of plate 6 lies to the left of leg 32 of plate 7. On the other or right side of the FIG. 1, leg 32 of plate 7 lies in front of the right end leg of plate 6. The legs of 6 and 7 are shaped in the cross-section as seen in FIG. 2 but with the legs at the opposite end of plates 6, 7 (right side of FIG. 1) being reversed as to position. Therefore, in usage, upon resistance being encountered by blade 1 as it is pushed or pulled in the soil by the device user, spring steel sides 5 bend thus causing plates 6 and 7 to slide relative to each other. Such deformation of sides 5 and sliding of 6 and 7 relation to each other is limited in that edge 40 of leg 30 of plate 6 and edge 42 of leg 34 of plate 7 abut each other as well as do the corresponding edges of leg 34 in FIG. 1. Thus, blade 1 upon encountering significant resistance causes bending of resilient sides 5 and thus lateral sliding of plates 6 and 7 relative to each other. Assuming blade 1 is being pushed away from the user, this deflection process causes the front edge of blade 1 to tilt upwardly, thus tending to reduce the resistance as the blade comes toward the soil surface. The device, therefore, in usage is used in push-pull strokes toward and away from the user with the power strokes generally being away from the user while the strokes toward the user being generally recovery strokes.

Thus, it is seen that as the device is used, when significant resistance is encountered on a stroke away from the user, the deformation of sides 5 of the trapezoidal frame causes blade 1 to tilt up in front thus tending to cause the blade to change its angle of attack and come to the surface. The device, therefore, automatically adjusts its angle of attack relative to the position in which it is held by the user. Of course, upon continual deformation of sides 5, edges 40 and 42 respectively of plates 6 and 7, as well as their counterparts in leg 32 and the leg of plate 6 behind 34 in FIG. 1, abut each other and prevent further deformation.

Upon the tiller being removed from the soil or upon decreased resistance to the tiller blade the spring steel 5 and auxiliary spring 22, if any, return the resilient structure to its natural shape as seen in FIG. 1.

The shape of blade 1 may be other than diamond shape, for example it could be circular, could be square, could be rectangular but it has been found the diamond shape is optimum for subsurface tilling i.e., as the blade is pushed along approximately an inch to two inches beneath the surface in motions toward and away from the user the diamond shaped blade has been found preferable to other shaped blades.

The depiction of the device in FIG. 1 is not to scale but the parts have been enlarged somewhat in an effort to clearly show the relationship to each other. Spring means other than 22, for example a compression spring can be mounted between edges 40 and 42 of plates 6 and 7 thereby tending to resist deformation of this trapezoidal spring frame during usage.

Other modifications of this invention will become apparent to the reader and user, all within the scope of this invention.

Having fully described my invention, I claim:

1. A tiller having:
   a. polygon shaped frame means made of spring steel;
   b. cutting means attached to one side of said polygon shaped frame means;
   c. handle means securely attached to another side of said polygon shaped frame means;
   d. said polygon shaped frame means automatically adjusting the angle of attack of said cutting means relative to the resistance encountered by said cutting means in the soil in which said tiller is employed; and
   e. plural plate-stop means mounted within said polygon shaped frame means in such manner that said plate-stop means abut each other upon deformation of said frame means a predetermined amount and prevent deformation beyond said predetermined amount.

2. The tiller of claim 1 wherein spring means are associated with said plate-stop means in such manner as to resist deformation of said frame means.

3. The tiller of claim 2 wherein said polygon shaped frame means is trapezoidal in shape.

4. The tiller of claim 3 wherein said trapezoidal shaped frame means has reinforcing means along the sides thereof to which said handle means and said cutting means are attached.

5. The tiller of claim 4 wherein said cutting means is a flat blade sharpened on at least one side.

6. The tiller of claim 5 wherein said handle means is adjustably mounted relative to said one side of said polygon shaped frame means.

7. The tiller of claim 6 wherein said blade is diamond shaped.

8. A tiller having:
   a. polygon shaped frame means made of flat spring material, said polygon shaped frame means having side portions with each of said side portions of said polygon shaped frame means having a centerline extending along the longitudinal extent thereof whereby said centerlines of all of said side portions of said frame means collectively define a plane;
   b. cutting means attached to one of said portions of said polygon shaped frame means;
   c. longitudinally extending handle means secured to another of said side portions of said polygon shaped frame means;
   d. the longitudinal axis of said handle means lying substantially in the plane of said centerlines of said portions of said polygon shaped frame means;
   said polygon shaped frame means automatically reducing the angle of attack of said cutting means upon said cutting means encountering resistance in the soil in which said tiller is being employed.

9. The tiller of claim 8 in which said flat spring material is spring steel.

10. The tiller of claim 8 in which said polygon shaped frame means is trapezoidal in shape.

* * * * *